(12) United States Patent
Yuzawa

(10) Patent No.: US 9,152,030 B2
(45) Date of Patent: Oct. 6, 2015

(54) LIGHT-ADJUSTING UNIT AND PROJECTOR

(71) Applicant: Seiko Epson Corporation, Tokyo (JP)

(72) Inventor: Fumio Yuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 60 days.

(21) Appl. No.: 13/765,745

(22) Filed: Feb. 13, 2013

(65) Prior Publication Data

US 2013/0215396 A1   Aug. 22, 2013

(30) Foreign Application Priority Data

Feb. 20, 2012 (JP) ................. 2012-033819

(51) Int. Cl.
*G03B 21/14* (2006.01)
*G03B 21/20* (2006.01)
*F21V 21/14* (2006.01)

(52) U.S. Cl.
CPC ............ *G03B 21/2053* (2013.01); *F21V 21/14* (2013.01)

(58) Field of Classification Search
CPC ........... G02B 5/30; G03B 21/14; G03B 21/28
USPC ...................... 353/97, 75; 396/452
See application file for complete search history.

(56) References Cited

U.S. PATENT DOCUMENTS

| | | | |
|---|---|---|---|
| 7,798,653 B2* | 9/2010 | Inui et al. | 353/97 |
| 2009/0174869 A1 | 7/2009 | Inui et al. | |
| 2009/0251757 A1* | 10/2009 | Yamamura et al. | 359/230 |
| 2011/0249439 A1* | 10/2011 | Chen et al. | 362/249.1 |
| 2011/0310358 A1* | 12/2011 | Wakabayashi et al. | 353/38 |

FOREIGN PATENT DOCUMENTS

| | | |
|---|---|---|
| CN | 1912734 A | 2/2007 |
| JP | 2007-047337 A | 2/2007 |
| JP | 2008-145949 A | 6/2008 |
| JP | 2010-175679 A | 8/2010 |
| WO | WO-2007-013564 A | 2/2007 |

* cited by examiner

*Primary Examiner* — William C Dowling
*Assistant Examiner* — Jerry Brooks
(74) *Attorney, Agent, or Firm* — ALG Intellectual Property, LLC

(57) ABSTRACT

A light-adjusting unit includes: a light-shielding plate centered an optical axis of an incoming light flux and configured to block the light flux in response to the amount of rotation; a rotation transmitting gear configured to hold and rotate the light-shielding plate; a supporting shaft configured to rotatably support the rotation transmitting gear; and a supporting substrate on which the supporting shaft is provided, and the light-shielding plate is provided on one surface side of the supporting plate, and the rotation transmitting gear is provided on the other surface side of the supporting substrate opposite to the one surface side.

12 Claims, 5 Drawing Sheets

LIGHT-ADJUSTING UNIT AND PROJECTOR

BACKGROUND

1. Technical Field

The present invention relates to a light-adjusting unit and a projector.

2. Related Art

In the related art, a projector configured to modulate a light flux emitted from a light source unit by a light-modulating unit according to an image signal and project the modulated light flux on a screen or the like as image light is known. Examples of such a projector include those having a light-adjusting unit configured to adjust the light amount of the light flux to be caused to enter the light-modulating unit corresponding to the brightness of an image to be projected. The projectors having such a light-adjusting unit provide high dynamic contrast.

A light-adjusting unit disclosed in JP-A-2010-175679 includes a dimming unit configured to dim a light flux emitted from a light source, a second gear and a third gear having a dimming unit mounted thereon and configured to rotate for changing the position of the diming unit, a base portion having a supporting shaft configured to rotatably support the second gear and the third gear and configured to sandwich the second gear and the third gear respectively with an optical component housing in the direction substantially orthogonal to an axial center of the supporting shaft. In this configuration, the supporting shaft is allowed to be projected from a rotating portion, the rotating portion is prevented from coming apart from the supporting shaft without arranging a guard ring or the like, and a stable rotation is achieved in order for changing the position of the dimming unit adequately.

In the light-adjusting unit disclosed in JP-A-2010-175679, the second gear and the third gear are provided on the same side as the side where the dimming unit (light-shielding plate) is provided with respect to the base portion. In other words, the second gear and the third gear are provided on the side where the light flux passes, and are subject to a transfer of heat generated by the light flux blocked by the dimming unit. Therefore, there is a problem that the second gear and the third gear expand by the transfer of the heat, and a seizure of these gears with each other (a state of being stuck and immobilized) may often occur. For reference, the second gear and the third gear are formed of synthetic resin or the like having the high heat resistance. In the light-adjusting unit disclosed in JP-A-2010-175679, the second gear and the third gear have a configuration of a spur gear. Therefore, the light-adjusting unit has a problem that a noise is liable to occur due to the engagement between the gears at the time of driving. Therefore, for the purpose of silencing at the time of driving, a method of applying lubricant such as grease is employed. However, problems such as an increase in noise when being used for a long time, seizure of foreign substances adherent to grease between the gears, and unstable operation under a low temperature environment still exist.

Therefore, a light-adjusting unit and a projector capable of inhibiting the thermal transfer to the gears and a reduction of the noise at the time of driving have been demanded.

SUMMARY

An advantage of some aspects of the invention is to solve at least a part of the problems described above, and the invention can be implemented as the following forms or application examples.

A light-shielding plate is disposed on one surface side of a supporting substrate, and rotation transmitting gears are provided on the other surface side opposing the one surface side through the supporting substrate. In this configuration, since the rotation transmitting gears are provided on the side opposite from the side where the light flux passes, heat generated by the light flux blocked by the light-shielding plate is hardy transferred. Accordingly, thermal expansion of the rotation transmitting gears does not occur easily, so that seizure of the rotation transmitting gears with each other may be prevented.

A gear configured to transmit the rotation of a motor is provided on the other surface side of the supporting substrate, which is the same side as the side where the rotation transmitting gear is provided. Accordingly, thermal expansion of the gear does not occur easily, so that the seizure between the gear and the rotation transmitting gears may be prevented.

The gear and the rotation transmitting gears have a configuration of a helical gear, so that a noise at the time of driving may be reduced. Therefore, silencing at the time of driving is achieved.

By pressing and urging the rotation transmitting gears against the supporting substrate by urging members rattling in the axial direction or the radial direction of shafts with respect to sleeves may be reduced. Accordingly, rattling of the rotation of the rotation transmitting gears may be restrained. When the rotation transmitting gears rotate, the shafts rotate correspondingly, and the rotation transmitting members rotate so as to follow the rotation of the shafts. By the rotation of the rotation transmitting members, the light-shielding plate rotates. Therefore, rattling of the rotation of the rotation transmitting gears may be restrained, and heat transfer from the light-shielding plate to the gear and the rotation transmitting gears may also be restrained. Consequently, rattling of the light-shielding plates is restrained, so that the light-shielding plate may be rotated stably for a long time.

With the light-adjusting unit configured to restrain thermal expansion of the rotation transmitting gears and other gears and prevent the rattling of the rotation of the rotation transmitting gear, light-adjusting control for controlling the light amount to be passed is achieved with high degree of accuracy. Therefore, high dynamic contrast with respect to an image to be projected is realized and, in addition, the high dynamic contrast may be maintained for a long time. Also, a projector in which silencing of the light-adjusting unit is achieved is realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
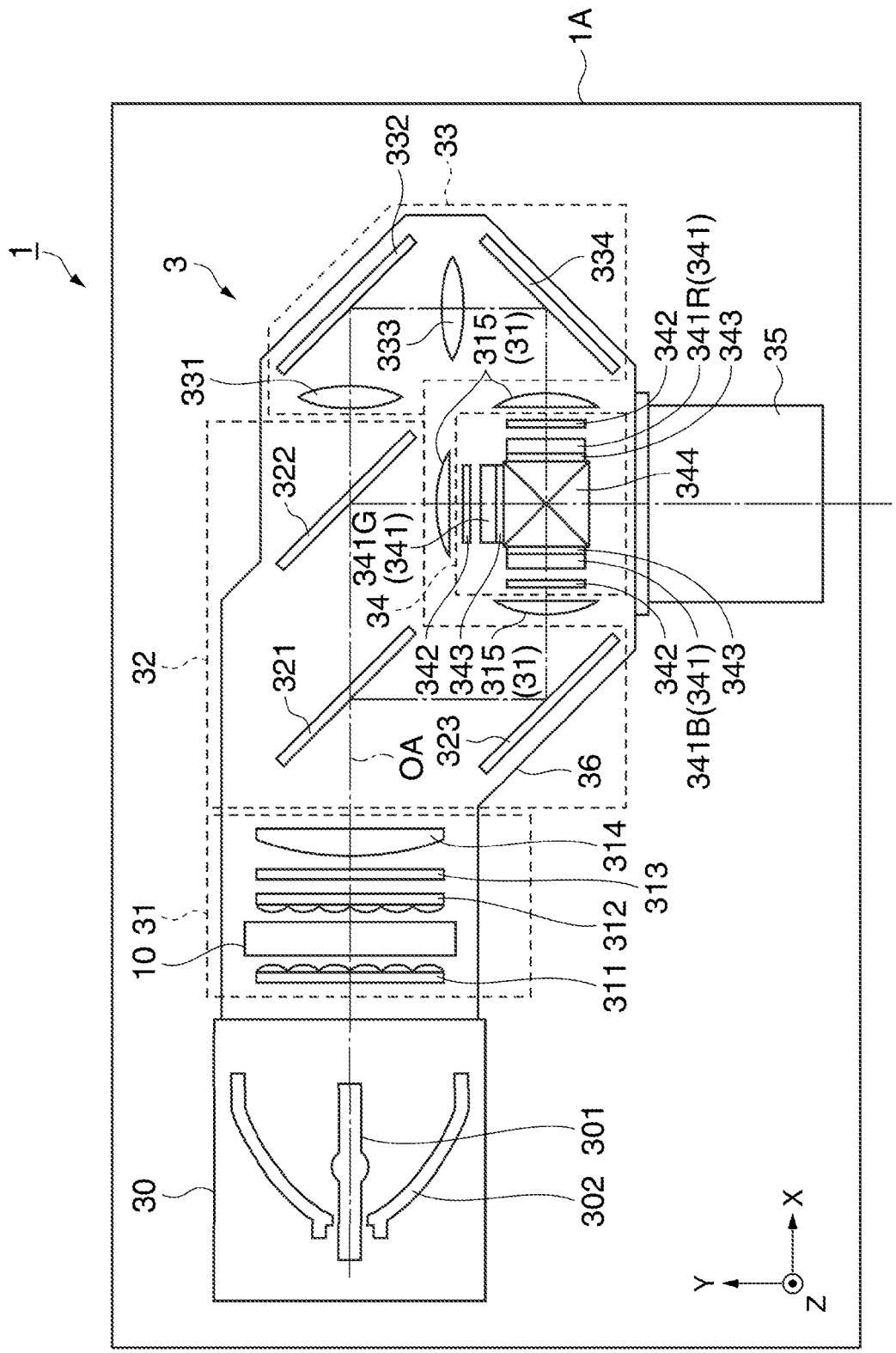
FIG. 1 is a schematic drawing illustrating a schematic configuration of a projector according to an embodiment.

Referring now to the drawings, an embodiment will be described.

Embodiment

FIG. 1 is a schematic drawing illustrating a schematic configuration of a projector 1 according to an embodiment. Referring to FIG. 1, the schematic configuration of the projector 1 according to this embodiment will be described.

The drawings from FIG. 1 onward are illustrated in an XYZ orthogonal coordinate system for the convenience of description. In the XYZ orthogonal coordinate system, the direction of travel of a light flux along an optical axis OA is determined as X(+X) direction, and the direction orthogonal to the X direction opposite from the direction in which image light goes out from a projecting lens 35 is defined as Y(+Y) direction. The direction orthogonal to the X direction and the Y direction and, simultaneously, an upward direction (the direction against the direction of gravitational force) in a posture of being placed on a table is defined as Z(+Z) direction.

The projector 1 of this embodiment is electronic equipment configured to modulate a light flux emitted from a light source in response to an image signal and project the modulated light flux on a projecting surface such as a screen in an enlarged scale. The projector 1 includes an optical unit 3, control unit (not illustrated), a power source unit (not illustrated) configured to supply the control unit or the like with electric power, and a cooling unit (not illustrated) configured to cool the interior of the projector 1, and the respective units are housed in the interior of an outer housing 1A as illustrated in FIG. 1.

The optical unit 3 is a unit configured to optically process a light flux emitted from a light source unit 30, and form and project image light according to the image signal on the basis of a control by the control unit. The optical unit 3 includes the light source unit 30, an illuminating optical unit 31, a color separating optical unit 32, a relay optical unit 33, an electro-optic unit 34, and an optical component housing 36 configured to house the optical units 30 to 34 in the interior thereof and configured to fixedly support a projecting lens 35 at a predetermined position.

The light source unit 30 includes a light source 301 and a reflector 302. The light source unit 30 aligns the direction of emission of a light flux emitted from the light source 301 by the reflector 302 to collimate the light flux with respect to the lighting optical axis OA and emits the collimated light to the illuminating optical unit 31. The lighting optical axis OA is a center axis of the light flux emitted from the light source unit 30 toward an illuminated area. The light source unit 30 of this embodiment employs an extra high-pressure mercury lamp.

The illuminating optical unit 31 includes a first lens array 311, a second lens array 312, a polarization conversion element 313, a superimposed lens 314, and collimating lenses 315. The first lens array 311 has a configuration in which small lenses (first small lenses) having a substantially rectangular-shaped outline when viewed in the direction of the lighting optical axis OA are arranged in a matrix pattern. The respective small lenses split the light flux emitted from the light source unit 30 into partial light fluxes and emit the split partial fluxes in the direction along the lighting optical axis OA. The second lens array 312 has a configuration in which small lenses (second small lenses) are arranged in a matrix pattern so as to correspond to the partial light flux outgoing from the small lenses of the first lens array 311. The second lens array 312 causes the partial light fluxes going out from the first lens array 311 to direct toward the superimposed lens 314, respectively.

The polarization converting element 313 has a function to align the respective partial light fluxes which correspond to random polarized light going out from the second lens array 312 into substantially one type of polarized light which can be used by a liquid crystal panel 341. The respective partial light fluxes going out from the second lens array 312 and converted into the substantially one type of the polarized light by the polarization conversion element 313 are substantially superimposed on the surface of the liquid crystal panel 341 by the superimposed lens 314. The light flux going out from the superimposed lens 314 is collimated by the collimating lenses 315 and is superimposed on the liquid crystal panel 341. Specifically, the collimating lenses 315 are provided for each of three color lights, described later.

The illuminating optical unit 31 includes a light-adjusting unit 10 configured to adjust a passing light amount of the light flux provided therein. Specifically, the light-adjusting unit 10 of this embodiment includes a pair of rotating light-shielding plates 7 (see FIGS. 2A and 2B), and the light-shielding plates 7 are arranged so as to be positioned between the first lens array 311 and the second lens array 312.

The light-adjusting unit 10 in this embodiment is configured to block part of the light flux emitted from the light source unit 30 (the first lens array 311) to adjust the light amount to be passed therethrough by the pair of light-shielding plates 7 rotating in a positional relationship of being substantially symmetrical with respect to a horizontal plane (XY plane) passing through the lighting optical axis OA on the basis of the control by the control unit. The light flux passing through the light-shielding plates 7 enters the second lens array 312. Detailed configuration and operation of the light-adjusting unit 10 will be described later.

The color separating optical unit 32 includes a first dichroic mirror 321, a second dichroic mirror 322, and a reflecting mirror 323. The color separating optical unit 32 separates the light flux outgoing from the illuminating optical unit 31 into the three color lights of red (R) light, green (G) light, and blue (B) light.

The relay optical unit 33 includes an incident side lens 331, a relay lens 333, and reflecting mirrors 332 and 334. The relay optical unit 33 guides an R light separated by the color separating optical unit 32 to an R-light liquid crystal panel 341R. In this embodiment, the relay optical unit 33 guides the R-light. However, the invention is not limited thereto, and a configuration in which the relay optical unit 33 guides a B light, for example, is also applicable.

The electro-optic unit 34 includes incident side polarizing plates 342, the liquid crystal panels 341 as a light-modulating unit (341R designates the R-light liquid crystal panel, 341G designates a G-light liquid crystal panel, and 341B designates a B-light liquid crystal panel), an outgoing-side polarizing plates 343, and a cross-dichroic prism 344. The incident side polarizing plates 342 and the outgoing-side polarizing plates 343 are provided for each of the liquid crystal panels 341R, 341G, and 341B.

The liquid crystal panels 341 (341R, 341G, and 341B) modulate the light fluxes separated by light colors by the color separating optical unit 32 in response to the image signal. The cross-dichroic prism 344 has a substantially square shape obtained by bonding four rectangular prisms to each other in plan view, and two dielectric multi-layer films are formed on interfaces of the bonded rectangular prisms. The cross-dichroic prism 344 combines the respective color lights modulated by the liquid crystal panels 341R, 341G, and 341B and directs the combined color light to the projecting lens 35.

The projecting lens 35 is composed of a lens unit which is a combination of a plurality of lenses, and projects the light flux modulated and combined by the electro-optic unit 34 on the projecting surface such as the screen in an enlarged scale.

Since the projector 1 is capable of adjusting the light amount of the light flux entering the electro-optic unit by the light-adjusting unit 10, for example, dynamic contrast of the image to be projected may be improved by adjusting the light amount of the light flux in response to scenes.

Figure 2A:
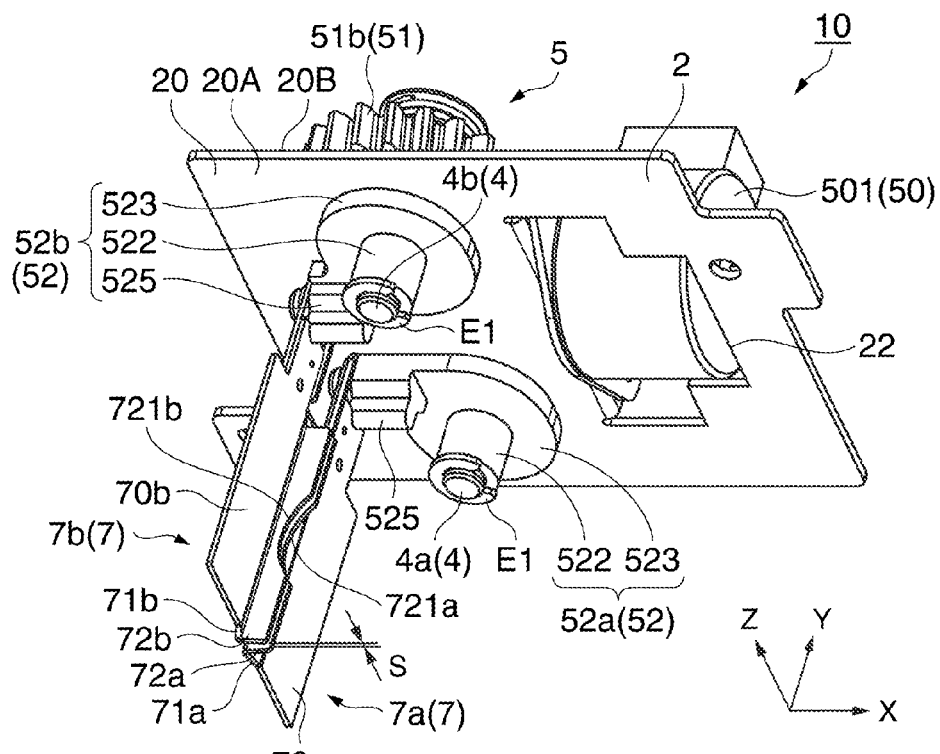
FIGS. 2A and 2B are perspective views illustrating a schematic configuration of a light-adjusting unit.
Figure 2B:
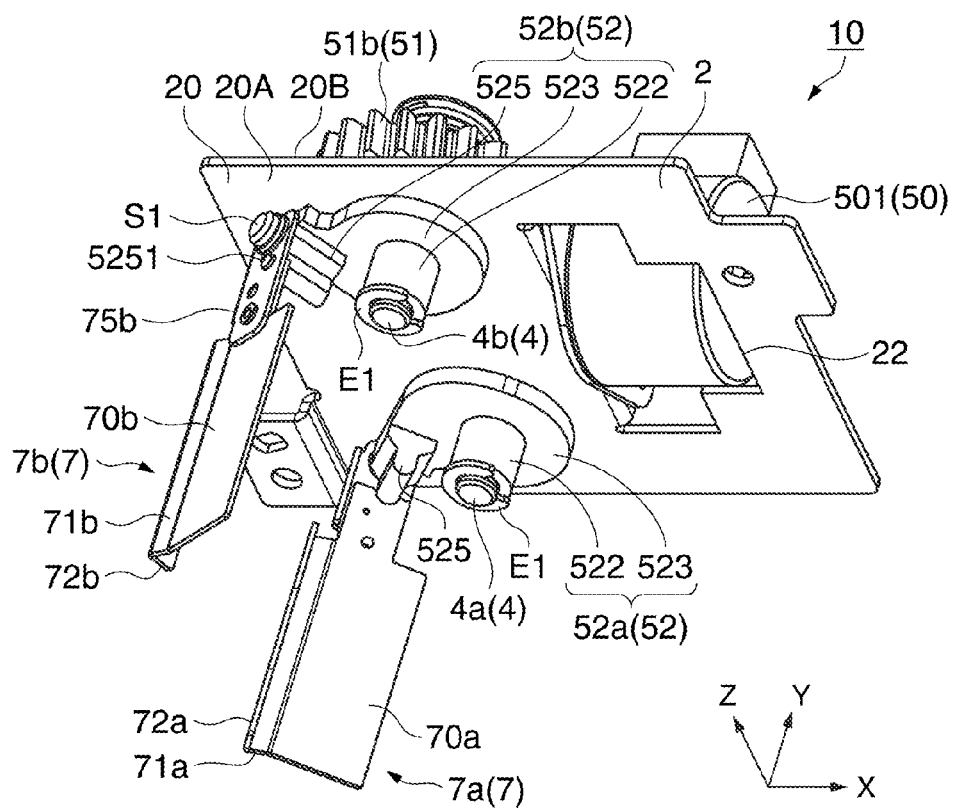
Figure 3:
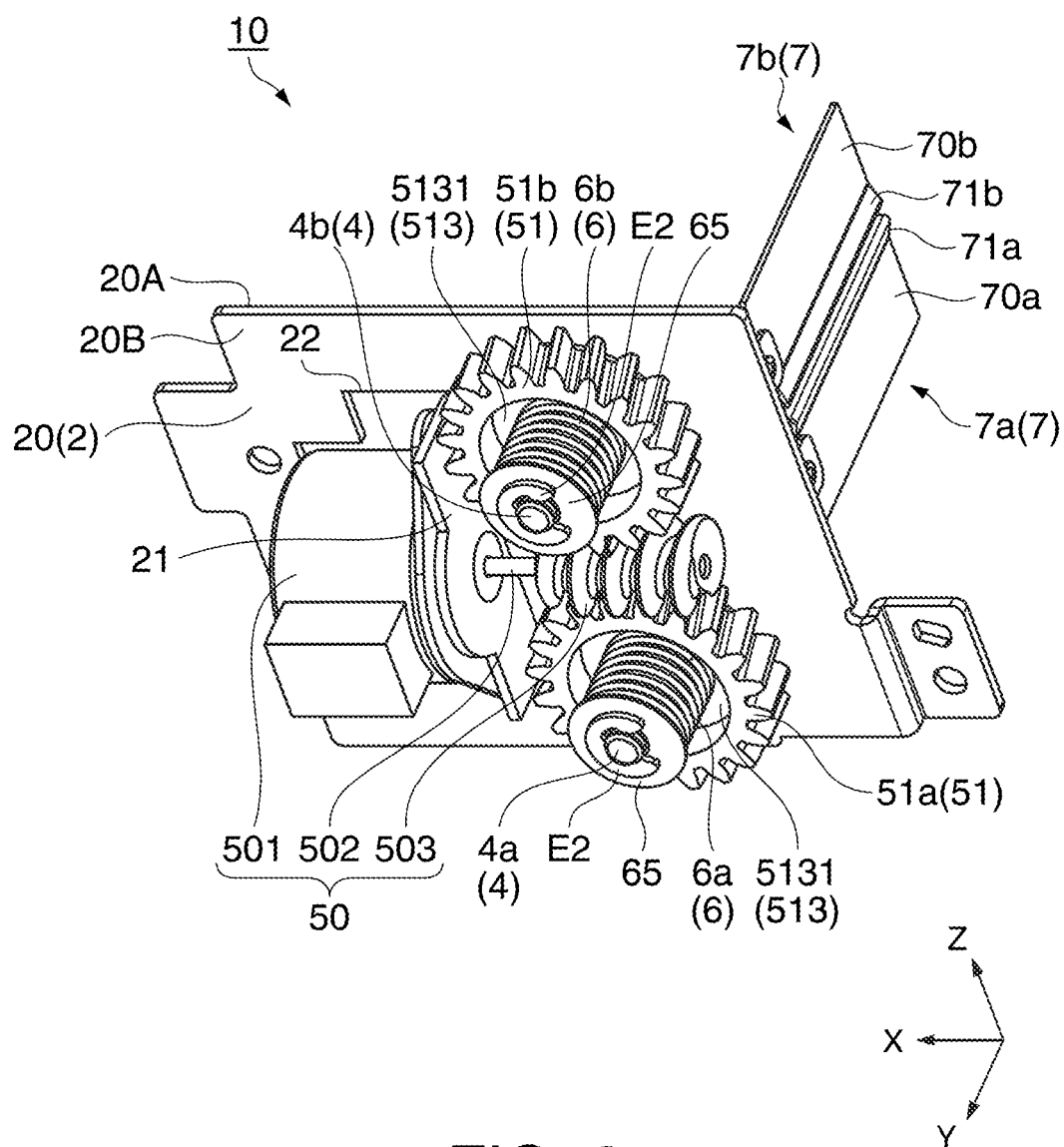
FIG. 3 is a perspective view illustrating the schematic configuration of the light-adjusting unit.
Figure 4:
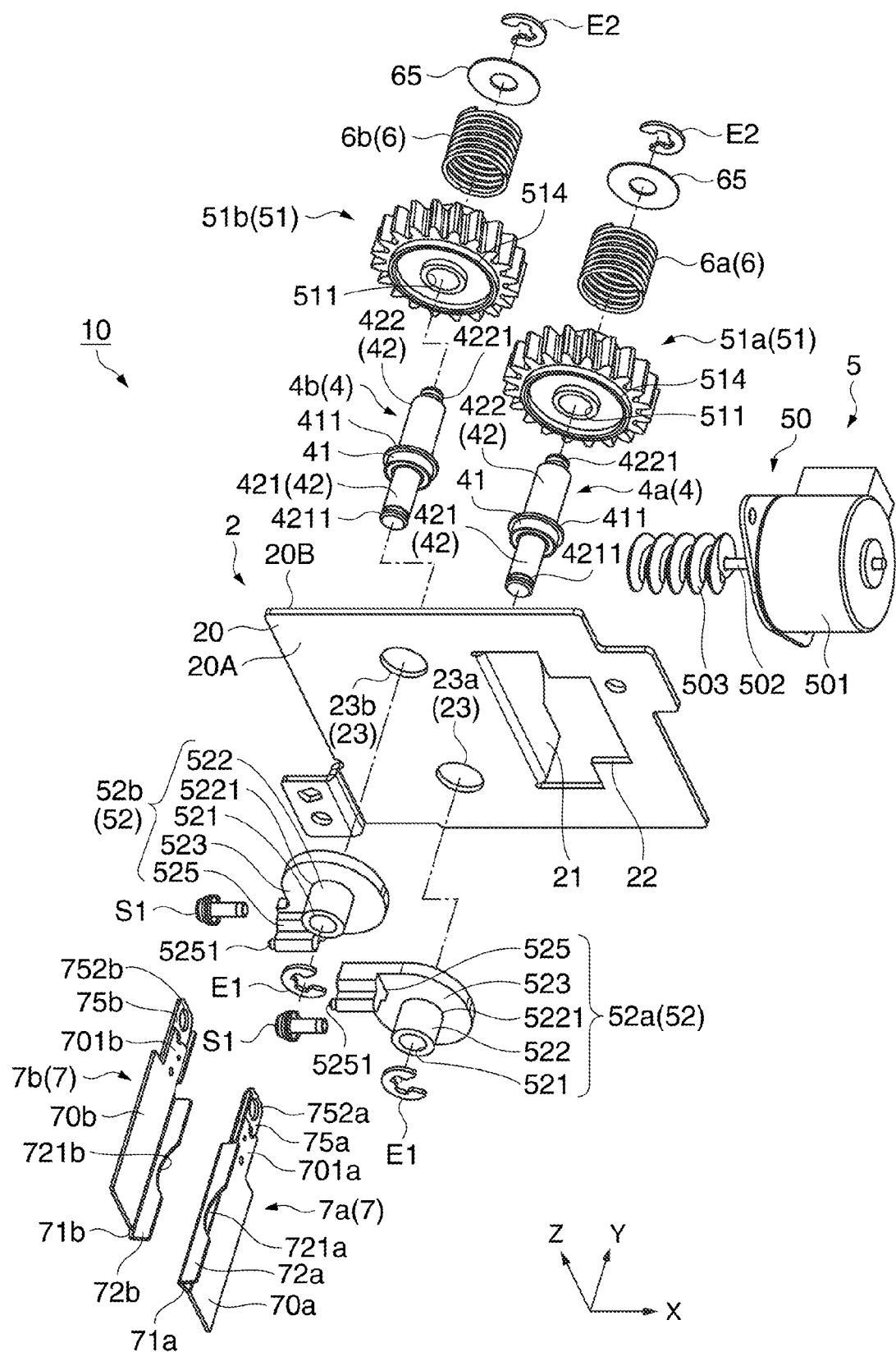
FIG. 4 is an exploded perspective view illustrating the light-adjusting unit.
Figure 5:
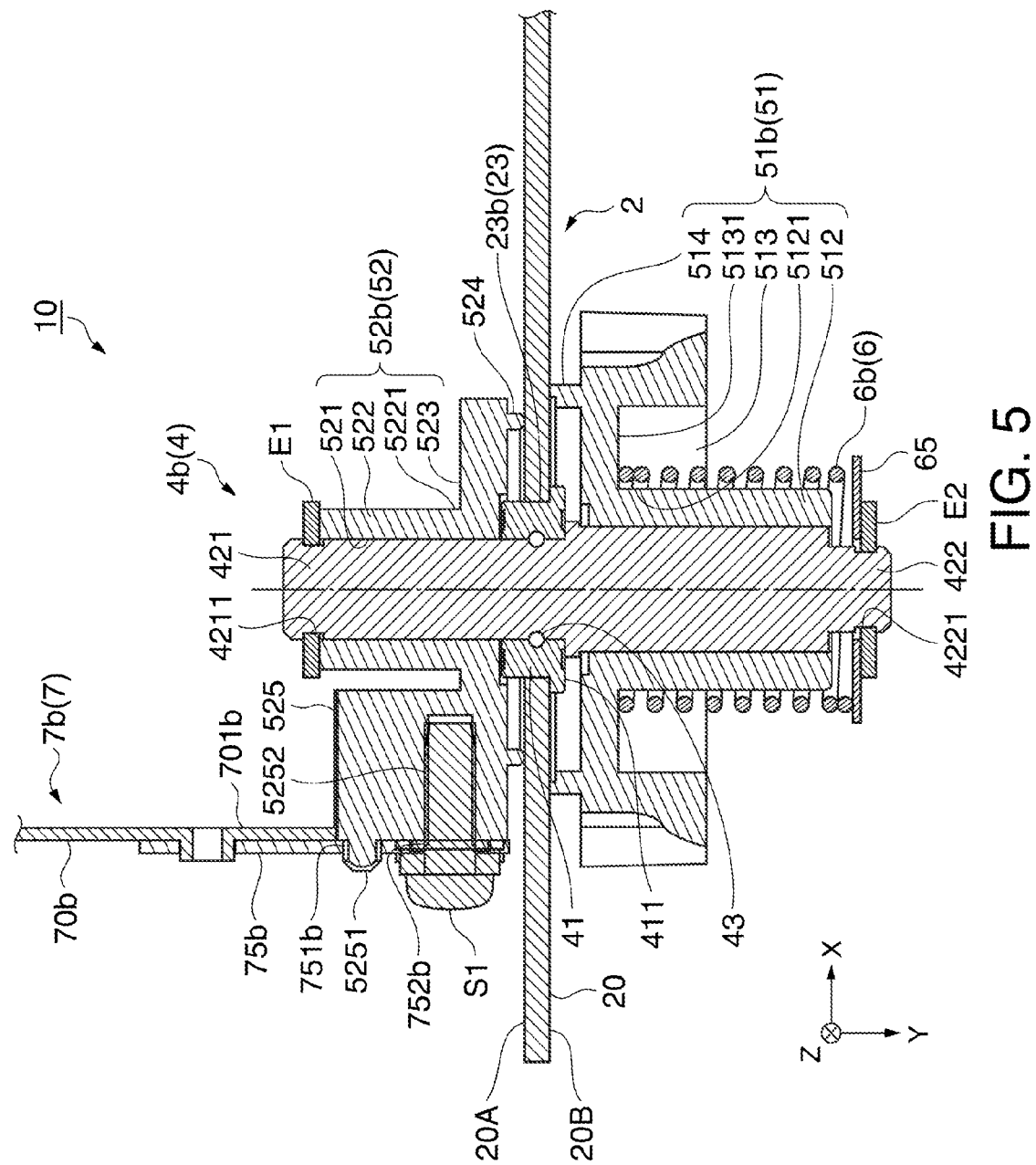
FIG. 5 is a schematic cross-sectional view illustrating the light-adjusting unit.

FIGS. 2A and 2B are perspective views illustrating a schematic configuration of the light-adjusting unit 10. FIG. 2A is a perspective view illustrating a state in which the light-shielding plates 7 of the light-adjusting unit 10 are closed (fully-closed state) and FIG. 2B is a perspective view illustrating a state in which the light-shielding plates 7 of the light-adjusting unit 10 are opened (fully-opened state). FIG. 3 is a perspective view illustrating a schematic configuration of the light-adjusting unit 10. Specifically, FIG. 3 is a perspective view illustrating the state in which the light-shielding plates 7 are closed, viewed from the surface 20B side of the supporting substrate 2. FIG. 4 is an exploded perspective view illustrating the light-adjusting unit 10. FIG. 5 is a schematic cross-sectional view of the light-adjusting unit 10. FIGS. 2A and 2B and FIG. 4 are the drawings illustrating the light-adjusting unit 10 viewed from the light flux outgoing side (+X direction). Referring now to FIG. 2A to FIG. 5, the configuration and the operation of the light-adjusting unit 10 will be described.

In the following drawings, in the respective members provided in pairs, the reference numeral of one of the pair of the members is added with a suffix "a" and the reference numeral of the other member is added with a suffix "b" for identification. For the convenience of description, if the configuration is common for the both components, the reference signs "a" and "b" are omitted in the description as needed.

As illustrated in FIG. 2A, a state in which the light-adjusting unit 10 blocks the light flux by the pair of light-shielding plates 7 to the maximum (a state in which the passing light amount is minimized) is referred to as "fully-closed state" (the state in which the light-shielding plates 7 are closed), which is used below as needed. As illustrated in FIG. 2B, a state in which the light-adjusting unit 10 blocks the light flux by the pair of light-shielding plates 7 to the minimum (a state in which the passing light amount is maximized (the state in which the light flux is not blocked in this embodiment)) is referred to as "fully-opened state", which is used below as needed.

As illustrated in FIG. 2A to FIG. 4, the light-adjusting unit 10 substantially includes the supporting substrate 2, a pair of supporting shafts 4 (4a, 4b), a motor 50, a pair of rotation transmitting gears 51 (51a, 51b), a pair of rotation transmitting members 52 (52a, 52b), and the pair of light-shielding plates 7 (7a, 7b) held by the rotation transmitting members 52. The light-adjusting unit 10 includes a pair of coil springs 6 (6a, 6b) as urging members configured to press the rotation transmitting gears 51 against the supporting substrate 2. The motor 50 and the rotation transfer gears 51 constitute a drive unit 5.

The supporting substrate 2 includes a substrate body 20 formed into substantially a rectangular shape and the pair of supporting shafts 4 mounted on the substrate body 20 as illustrated in FIGS. 2A and 2B and FIG. 3. The supporting substrate 2 supports the rotation transmitting members 52 and the light-shielding plates 7 on one surface 20A side of the substrate body 20 and supports the motor 50 and the rotation transmitting gears 51 on the other surface 20B side thereof opposing the one surface 20A through the substrate body 20.

In the following description, the one surface 20A and the other surface 20B of the substrate body 20 are referred to and used as a surface 20A and a surface 20B as needed.

The substrate body 20 is formed by sheet-metal processing and, as illustrated in FIG. 4, is formed with a upright portion 21 cut out and bent toward the surface 20B side at a substantially center portion, and a hole portion 22 generated by the formation of the upright portion 21. The upright portion 21 is also formed with a hole portion (not illustrated) for fixing the motor 50. The substrate body 20 is formed with hole portions 23 (23a, 23b) which allows insertion of the supporting shafts 4 (4a, 4b) therethrough.

The light-adjusting unit 10 is fixed to an optical component housing 36 by fixing the supporting substrate 2 to a side surface of the optical component housing 36 on the +Y side (see FIG. 1). When the light-adjusting unit 10 is fixed to the optical component housing 36, the pair of light-shielding plates 7 (7a, 7b) are arranged between the first lens array 311 and the second lens array 312.

The supporting shafts 4 are members configured to support the rotation transmitting gears 51 and the rotation transmitting members 52 so as to be rotatable respectively. The supporting shafts 4 each include a sleeve 41 having a cylindrical shape and provided on the supporting substrate 2 and a column-shaped shaft 42 held inside the sleeve 41 so as to be rotatable and extending to both sides of the sleeve 41 illustrated in FIG. 4 and FIG. 5. The sleeves 41 and the shafts 42 are configured to be capable of rotating with respect to each other via bearings 43. The bearings 43 each include a row of ball bearings.

The supporting shafts 4 are fixed to the supporting substrate 2 by press-fitting the sleeves 41 into the hole portions 23 of the substrate body 20 as illustrated in FIG. 4 and FIG. 5. At this time, flange portions 411 provided at end portions of the sleeves 41 come into abutment with the surface 20B of the substrate body 20. In each of the shafts 42, a portion extending on the one surface 20A side is referred to as a front side shaft 421 and a portion extending on the other surface 20B is referred to as a back side shaft 422. The pair of the supporting shafts 4 (4a, 4b) are configured in the same manner, respectively, and are fixed to the supporting substrate 2 in the same manner.

The motor 50 is a drive source which generates a drive force for rotating the rotation transmitting gears 51, and the rotation thereof is controlled by the control unit. The motor 50 used in this embodiment is a stepping motor. The motor 50 includes a motor body 501 having a spindle 502 as a supporting shaft and a pinion 503 as a gear provided on the spindle 502 as illustrated in FIG. 3 and FIG. 4. The pinion 503 used in this embodiment is a worm having a configuration of a helical gear.

The motor 50 is fixed to the upright portion 21 in a state in which part of the motor body 501 is inserted into the hole portion 22 of the substrate body 20 as illustrated in FIG. 3 and FIG. 4. The spindle 502 extends from the upright portion 21 and the pinion 503 is press-fitted into the spindle 502. The single pinion 503 engages the two rotation transmitting gears 51 (51a, 51b), described later.

The rotation transmitting gears 51 have a configuration of a helical gear. In other words, the rotation transmitting gears 51 have a configuration of a worm wheel engaging the pinion 503 (worm). The rotation transmitting gears 51 are a gear configured to rotate the shaft 42 by the rotation of the pinion 503 (the drive force of the motor 50) transmitted thereto. The pair of rotation transmitting gears 51 (51a, 51b) rotate in the directions opposite from each other by the rotation of the pinion 503.

As illustrated in FIG. 4 and FIG. 5, the rotation transmitting gears 51 are each provided with a cylindrical portion 512 having a center hole 511 centered at the center axis of rotation and being formed into a cylindrical shape. The center hole 511 is set to have an inner diameter slightly larger than the outer diameter of the supporting shaft 4 (the back side shaft 422). As illustrated in FIG. 5, the rotation transmitting gear 51 is formed with a groove portion 513, which is formed into a groove shape, on the outer periphery of a base portion 5121 of the cylindrical portion 512. The rotation transmitting gear 51 is also provided with a projecting portion 514 projecting in a ring shape on an end surface thereof. The pair of rotation transmitting gears 51 (51a, 51b) have the same structure.

The coil springs 6 as the urging members have a configuration of a compression coil spring. The coil springs 6 are members configured to press the rotation transmitting gears 51 against the supporting substrate 2. As described later, the coil springs 6 restrain axial rattling and radial rattling of the shafts 42 with respect to the sleeves 41 by pressing the rotation transmitting gears 51 against the supporting substrate 2.

The rotation transmitting gears 51 (51a, 51b) are provided on the surface 20B of the substrate body 20 by the insertion of the back side shafts 422 of the supporting shafts 4 (4a, 4b) into the center holes 511 respectively as illustrated in FIG. 3 to FIG. 5. At this time, the rotation transmitting gears 51 (51a, 51b) are provided so as to engage the pinion 503.

The rotation transmitting gears 51 (51a, 51b) are slid on the back side shafts 422, and then the coil springs (6a, 6b) are slid along the cylindrical portions 512, respectively, as illustrated in FIG. 4 and FIG. 5. Subsequently, spring holding plates 65 configured to prevent the coil springs 6 from coming apart are slid on the back side shafts 422 while pressing the coil springs 6. Subsequently, fixing rings E2 are locked to groove portions 4221 formed on end portions of the back side shafts 422. Accordingly, the rotation transmitting gears 51 (51a, 51b) are mounted on the back side shafts 422.

The rotation transmitting members 52 (52a, 52b) are members configured to rotate the light-shielding plates 7 (7a, 7b) held thereby by the rotation of the shafts 42 transmitted thereto. As illustrated in FIGS. 2A and 2B, FIG. 4 and FIG. 5, the rotation transmitting members 52 are each provided with a cylindrical portion 522 including a center hole 521 centered at the center axis of rotation and being formed into a cylindrical shape. A base portion 5221 of the cylindrical portion 522 (see FIG. 4 and FIG. 5) is provided with a disc-shaped base portion 523. An end surface of the base portion 523 includes a projecting portion 524 (see FIG. 5) projecting in a ring shape.

The rotation transmitting members 52 each include a light-shielding plate mounting portion 525 provided in the vicinity of an outer periphery of the base portion 523 and configured to mount and hold the light-shielding plate 7. The light-shielding plate mounting portions 525 are configured to be positioned substantially symmetrically when the rotation transmitting members 52a and 52b are mounted on the supporting shafts 4. Otherwise, the rotation transmitting members 52 (52a, 52b) have the same structure. The light-shielding plate mounting portion 525 is provided with a screw hole 5252 (see FIG. 5) opening toward the outer periphery, and the light-shielding plate 7 is mounted on the rotation transmitting member 52 with a screw S1 screwed into the screw hole 5252 as illustrated in FIG. 4 and FIG. 5.

The rotation transmitting members 52 (52a, 52b) are provided on the surface 20A of the substrate body 20 through the insertion of the front side shafts 421 of the supporting shafts 4 (4a, 4b) into the center holes 521 respectively as illustrated in FIG. 4 and FIG. 5. The rotation transmitting members 52 (52a, 52b) are slid on the front side shafts 421, and then a fixing ring E1 is locked to a groove portion 4211 provided at an end portion of the front side shaft 421, as illustrated in FIG. 4 and FIG. 5. Accordingly, the rotation transmitting members 52 (52a, 52b) are mounted on the front side shaft 421.

The light-shielding plates 7 include a pair of the light-shielding plate 7a held by the rotation transmitting member 52a and the light-shielding plate 7b held by the rotation transmitting member 52b. The light-shielding plates 7 (7a and 7b) of this embodiment are arranged so as to be substantially symmetrical with respect to the lighting optical axis OA of the incident light flux (specifically, with respect to the horizontal plane (XY plane) passing through the lighting optical axis OA).

The light-shielding plates 7 (7a and 7b) change the amount of rotation in response to the driving of the motor 50 controlled on the basis of the number of steps between the fully-closed state illustrated in FIG. 2A and the fully-opened state illustrated in FIG. 2B. With this rotating operation, the light-shielding plates 7 (7a, 7b) block the light flux to be passed therethrough in response to the amount of rotation and adjust the light amount to be passed therethrough. From now onward, the configuration of the light-shielding plates 7 will be descried with the one light-shielding plate 7b as an example.

The light-shielding plate 7b is formed by bending a metal plate. As illustrated in FIG. 2A to FIG. 4, the light-shielding plate 7b includes a rectangular-shaped light-shielding body 70b, a first inclined portion 71b inclined from a longitudinal side end portion of the light-shielding body 70b on the lighting optical axis OA side toward the light flux incident side, and the second inclined portion 72b inclined from a longitudinal side end portion of the first inclined portion 71b on the lighting optical axis OA side toward the light flux outgoing side. More specifically, the first inclined portion 71b is provided at an end portion of the light-shielding plate 7b along the axial direction of the supporting shaft 4 and, simultaneously at an end portion of the light-shielding plate 7b on the side which moves toward and away from the one light-shielding plate 7a by the rotation of the rotation transmitting gear 51b, and is inclined in the direction apart from the supporting shafts 4. Also, the second inclined portion 72b is provided at an end portion of the first inclined portion 71b along the axial direction of the supporting shafts 4 and is inclined in the direction toward the supporting shafts 4.

The light-shielding plate 7b is formed with an arcuate-shaped cutout potion 721b, which forms a shape surrounding the lighting optical axis OA when the light-shielding plate 7b is provided, at a center of the end portion of the second inclined portion 72b on the lighting optical axis OA side. The light-shielding plate 7b is formed with a connecting portion 701b (see FIG. 4 and FIG. 5) extending at a short side end portion of the light-shielding body 70b.

The light-shielding plate 7b is provided with a connecting member 75b to be mounted on (connected to) the light-shielding plate mounting portion 525 of the rotation transmitting gear 52b as illustrated in FIGS. 2A and 2B, FIG. 4 and FIG. 5. The connecting member 75b is formed of a rectangular-shaped metallic panel. The connecting member 75b and the light-shielding body 70b are integrated by caulking the connecting member 75b and the connecting portion 701b.

The connecting member 75b is formed with a guiding hole 751b (see FIG. 5) and an insertion hole 752b (see FIG. 4 and FIG. 5). The connecting member 75b is mounted on the light-shielding plate mounting portion 525 by fitting a guiding hole 751b onto the guiding projection 5251 formed on the light-shielding plate mounting portion 525, inserting the screw S1 into the insertion hole 752b, and screwing the screw S1 into the screw hole 5252 of the light-shielding plate mounting portion 525. Accordingly, the light-shielding plate 7b is mounted on the rotation transmitting gear 52b.

The other light-shielding plate 7a is also configured in the same manner as the light-shielding plate 7b described above. The different point between the light-shielding plate 7a and the light-shielding plate 7b is that the light-shielding plate 7a and the light-shielding plate 7b of the embodiment are arranged substantially symmetrically with respect to the horizontal plane (XY plane) passing through the lighting optical axis OA when installed.

The light-shielding plate 7 improves the contrast of a projected image by setting the gap S (see FIG. 2A) between the light-shielding plates 7a and 7b in the fully-closed state to be small in order to decreases the light mount of the light flux passing between the light-shielding plates 7a and 7b in the fully-closed state. Also, the change of the dimming rate (the rate of the light amount of the light flux entering the liquid crystal panel 341 when the light amount of the light flux entering the liquid crystal panel 341 in the fully-closed state is "1") may be set to be gentle by forming the cutout portions 721a and 721b on the second inclined portions 72a and 72b, so that visibility of the change in brightness of the projecting image caused by the light adjustment is lowered.

In the light-adjusting unit 10 of this embodiment, a bottom surface 5131 of the groove portion 513 of the rotation transmitting gear 51 is pressed against the surface 20B of the supporting substrate 2 by the coil spring 6 (the projecting portion 514 is pressed against the surface 20B) as illustrated in FIG. 5. The spring holding plate 65 is pressed against the supporting substrate in the direction opposite from the surface 20B side (+Y direction) of the supporting substrate 2.

Since the sleeve 41 is fixed by being press-fitted to the supporting substrate 2, the shaft 42 is pressed in the +Y direction by the operation of the coil spring 6 and is moved in the +Y direction by an amount corresponding to the gap of the bearings 43 in the axial direction (Y-axis direction). By the movement of the shaft 42 toward the +Y direction, the rotation transmitting members 52 move in the +Y direction, and are pressed against the surface 20A of the supporting substrate 2.

In this manner, the rotation transmitting gears 51 and the rotation transmitting members 52 are pressed against the surface 20B and the surface 20A of the supporting substrate 2 by the coil spring 6. In this configuration, the rotation transmitting gears 51 and the rotation transmitting members 52 rotate with reduced rattling in the axial direction and in the radial direction of the shaft 42 with respect to the sleeve 41. Therefore, the light-shielding plates 7 held indirectly by the rotation transmitting gears 51 are capable of rotating with reduced rattling.

In the light-adjusting unit 10, when the pinion 503 of the motor 50 rotates, the rotation transmitting gears 51 (51a, 51b) engaging the pinion 503 rotate in the directions opposite from each other. With the rotation of the rotation transmitting gears 51 (51a, 51b), the shafts 42 rotate in the directions opposite from each other with respect to the sleeves 41 by the bearings 43. Then, by the rotation of the shaft 42, the rotation transmitting members 52 (52a, 52b) rotate in opposite directions. When the rotation transmitting members 52 (52a, 52b) rotate, the light-shielding plates 7 (7a, 7b) connected thereto rotate in the directions opposite from each other. The rotation of the light-shielding plates 7 is substantially symmetrical with respect to the XY plane passing through the lighting optical axis OA in this embodiment.

According to the embodiment described above, the following effects are achieved.

According to the light-adjusting unit 10 of the embodiment, the light-shielding plates 7 are disposed on the one surface 20A side of the supporting substrate 2 and the rotation transmitting gears 51 are provided on the other surface 20B side opposing the surface 20A side through the supporting substrate 2. In this configuration, the rotation transmitting gears 51 are provided on the side opposite from the side where the light flux passes, and hence the heat generated by the light flux blocked by the light-shielding plates 7 is hardly transferred. Accordingly, the rotation transmitting gears 51 do not expand easily, so that the seizure of the rotation transmitting gears 51 (51a, 51b) with each other may be prevented.

According to the light-adjusting unit 10 of the embodiment, the pinion 503 as a gear configured to transmit the rotation of the motor 50 to the rotation transmitting gears 51 is provided on the other surface 20B side of the supporting substrate 2, which is the same side where the rotation transmitting gears 51 are provided. Accordingly, thermal expansion of the pinion 503 does not occur easily, and hence seizure between the pinion 503 and the rotation transmitting gears 51 (51a, 51b) may be prevented.

According to the light-adjusting unit 10 of this embodiment, the pinion 503 and the rotation transmitting gears 51 have a configuration of a helical gear, so that the noise generated at the time of driving may be reduced. Therefore, the light-adjusting unit 10 achieves silencing at the time of driving.

According to the light-adjusting unit 10 of this embodiment, the coil springs 6 reduce axial rattling and radial rattling of the shafts 42 with respect to the sleeves 41 by pressing the rotation transmitting gears 51 against the supporting substrate 2 and urging the same against the rotation transmitting gears 51. Accordingly, the rattling caused by the rotation of the rotation transmitting gears 51 may be restrained. When the rotation transmitting gears 51 rotate, the shafts 42 rotate correspondingly, and the rotation transmitting members 52 rotate so as to follow the rotation of the shafts 42. Then, by the rotation of the rotation transmitting members 52 the light-shielding plates 7 rotate. Therefore, rattling caused by the rotation of the rotation transmitting gears 51 may be restrained, and heat transfer from the light-shielding plates 7 to the pinion 503 and the rotation transmitting gears 51 may also be restrained. Therefore, rattling of the light-shielding plates 7 is restrained, so that the light-shielding plates 7 may rotate stably for a long time.

According to the light-adjusting unit 10 of this embodiment, since the rotation transmitting gears 51 (51a, 51b) and the pinion 503 have a configuration of a helical gear, a noise generated by engagement between the gears may be retrained, and hence lubricant such as grease or the like used in the related art for the purpose of silencing at the time of driving is not necessary any longer. Accordingly, problems such as the seizure of foreign substances adherent to grease between the gears, and unstable operation under the low temperature environment are solved.

When a motor having a performance that performs an over rotation and a returning operation repeatedly when the motor rotates is used as the motor 50, the pinion 503 is brought into a vibrating state, and causes a noise (high-frequency noise). However, according to the light-adjusting unit 10 of this embodiment, silencing is achieved even when such a motor is used by applying a load to the rotating operation of the driven rotation transmitting gears 51 which follows the pinion 503 by urging the rotation transmitting gears 51 against the supporting substrate 2 and urging the same by the coil springs 6.

According to the projector 1 of this embodiment, with the provision of the light-adjusting unit 10 which is capable of restraining the thermal expansion of the rotation transmitting gears 51 and the pinion 503, and restraining rattling of the rotation of the rotation transmitting gears 51, being able to carry out accurately light-adjustment of the light amount to be passed high dynamic contrast with respect to the image to be projected is achieved and, in addition, the high dynamic contrast is maintained for a long time. Also, a projector in which silencing of the light-adjusting unit 10 is achieved is realized.

The embodiments described above may be implemented by applying various modifications or improvements without departing from the scope of the invention. Modifications will be described below.

The light-adjusting unit 10 of this embodiment, in a state in which the coil springs 6 are not provided, the rotation transmitting gears 51 and the rotation transmitting members 52 are rotatably supported with respect to the supporting shafts 4 (shaft 42), respectively. However, the invention is not limited thereto, and a configuration in which the rotation transmitting gears 51 are configured to be rotatable with respect to the supporting shafts 4 (shaft 42) and the rotation transmitting members 52 are fixed to the shafts 42 is also applicable.

The light-adjusting unit 10 has a structure to press the rotation transmitting members 52 against the supporting substrate 2 by pressing the rotation transmitting gears 51 against the supporting substrate 2 by the coil springs 6. However, the invention is not limited thereto, and a structure to press the rotation transmitting gears 51 against the supporting substrate 2 by pressing the rotation transmitting members 52 against the supporting substrate 2 by the coil springs 6 is also applicable.

The light-adjusting unit 10 has a configuration in which the pinion 503 (worm) and the rotation transmitting gears 51 as the worm wheel are used. However, the invention is not limited thereto, and the configuration of a pinion or a rotation transmitting gear having a configuration of a spur gear is also applicable. In this case, by providing the gear having a configuration of a spur gear on the surface 20B opposite from the surface 20A on which the light-shielding plates 7 are provided in the same manner as this embodiment, the heatproof temperature of the synthetic resin which constitutes the gear may be set to be lower than the heatproof temperature of the gear in a case of being provided on the surface 20A side. Accordingly, since a resin material having lubricity may be used as the synthetic resin material which constitutes the gear (spur gear), a noise reduction is achieved in comparison with the case of the related art in which the gear (spur gear) is provided on the surface 20A side.

The light-adjusting unit 10 is configured to decelerate rotation of the pinion 503 (worm) to a predetermined number of revolutions by the rotation transmitting gears 51 as the worm wheel. However, in the case of the configuration in which the spur gear is used, deceleration may be achieved by adding the intermediate gear.

The light-adjusting unit 10 of this embodiment has a configuration of a row of bearings (ball bearings) as the bearings 43 of the supporting shafts 4. However, the invention is not limited thereto, and may be configured as two rows of bearings.

The light-adjusting unit 10 of the embodiment employs the coil spring 6 as the urging member. However, the urging member is not limited to the coil spring 6, and a leaf spring or the like may be employed.

In the light-adjusting unit 10 of the embodiment, the light-shielding plates 7 (7a, 7b) include the light-shielding plate bodies 70a and 70b, the first inclined portions 71a and 71b, and the second inclined portions 72a and 72b, and the second inclined portions 72a and 72b include the cutout portions 721a and 721b. However, the shapes of the first inclined portions 71a and 71b, the second inclined portions 72a and 72b, and the cutout portions 721a and 721b may be changed as needed.

The light-shielding plates 7 (7a, 7b) of the embodiment are arranged so as to be substantially symmetrical with respect to the horizontal plane (XY plane) passing through the lighting optical axis OA. However, the light-shielding plates do not have to be arranged symmetrically.

The light-adjusting unit 10 of the embodiment includes the light-shielding plates 7 configured to open and close in the Z-direction. However, the mechanism opening and closing in the Y-direction is also applicable.

The light source 301 of the embodiment employs an extra high pressure mercury lamp. However, the invention is not limited thereto, and various types of the electrical discharge lamps emitting high-bright light and, for example, a metal halide lamp or a high-pressure mercury lamp, or the like may be employed.

The optical units 3 of the embodiment employ so-called a three-panel system using three light-modulating units (liquid-crystal panels 341) corresponding to the red light, green light, and blue light. However, the invention is not limited thereto, and a light-modulating unit of a single plate system may be employed. It is also possible to additionally employ the light-modulating unit for improving the contrast.

The optical units 3 of the embodiment employ the transmitting type light-modulating apparatus (transmission liquid crystal panel 341). However, the invention is not limited thereto, and the reflection light-modulating unit may also be employed.

The entire disclosure of Japanese Patent Application No. 2012-033819, filed Feb. 20, 2012 is expressly incorporated by reference herein.

What is claimed is:

1. A light-adjusting unit comprising:
a light-shielding plate configured to block light flux traveling in a light flux direction in response to the amount of rotation;
a rotation transmitting gear configured to hold and rotate the light-shielding plate;
a supporting shaft configured to rotatably support the rotation transmitting gear;
a supporting substrate on which the supporting shaft is provided; and
a motor as a drive source, the motor including a motor body, a spindle, and a pinion configured to transmit the rotation of the motor to the rotation transmitting gear,
wherein
the light-shielding plate is provided on one surface side of the supporting substrate,
the rotation transmitting gear is provided on the other surface side of the supporting substrate opposite to the one surface side,
the pinion is provided on the other surface side of the supporting substrate, and
the pinion is positioned between two rotation transmitting gears including the rotation transmitting gear and directly abuts the two rotation transmitting gears, and
a portion into which the motor body is inserted is defined in the supporting substrate, the motor body extending through the portion of the supporting substrate into which the motor body is inserted and oriented such that the spindle extends generally in the light flux direction.

2. The light-adjusting unit according to claim 1, wherein the pinion and the rotation transmitting gear include a helical gear.

3. The light-adjusting unit according to claim 1, wherein
the supporting shaft is provided so as to extend from the one surface side and the other surface side of the supporting substrate to support the rotation transmitting gear on a portion extending from the other surface side of the supporting substrate, and
the light-adjusting unit includes:
- a rotation transmitting member configured to hold the light-shielding plate and rotatably supported by the supporting shaft extending from the one surface side of the supporting substrate; and
- an urging member arranged on the supporting shaft extending from the other surface side of the supporting substrate and configured to press and urge the rotation transmitting gear against the supporting substrate.

4. The light-adjusting unit according to claim 1, wherein the light-shielding plate includes:
a first inclined portion provided at an end portion thereof which moves toward and away by the rotation of the rotation transmitting gear, the first inclined portion extending along an axial direction of the supporting shaft and inclined in a direction away from the supporting shaft; and
a second inclined portion provided at an end portion of the first inclined portion, the second inclined portion extending along the axial direction of the supporting shaft and inclined in a direction toward the supporting shaft.

5. The light-adjusting unit according to claim 4, wherein the second inclined portion includes a cutout portion having a shape surrounding an area where the optical axis of the light flux is positioned when the light amount blocked by the light-shielding plate is maximum.

6. A projector comprising:
the light-adjusting unit according to claim 1;
a light source unit configured to emit the light flux; and
a light-modulating unit configured to modulate the light flux adjusted by the light-adjusting unit in response to an image signal.

7. A projector comprising:
the light-adjusting unit according to claim 1;
a light source unit configured to emit the light flux; and
a light-modulating unit configured to modulate the light flux adjusted by the light-adjusting unit in response to an image signal.

8. A projector comprising:
the light-adjusting unit according to claim 3;
a light source unit configured to emit the light flux; and
a light-modulating unit configured to modulate the light flux adjusted by the light-adjusting unit in response to an image signal.

9. A projector comprising:
the light-adjusting unit according to claim 4;
a light source unit configured to emit the light flux; and
a light-modulating unit configured to modulate the light flux adjusted by the light-adjusting unit in response to an image signal.

10. A projector comprising:
the light-adjusting unit according to claim 5;
a light source unit configured to emit the light flux; and
a light-modulating unit configured to modulate the light flux adjusted by the light-adjusting unit in response to an image signal.

11. The projector according to claim 6, comprising
a first lens array having a plurality of first small lenses configured to split the light flux emitted from the light-source unit into partial light fluxes; and
a second lens array having second small lenses corresponding to the first small lenses, wherein
the light-shielding plate is arranged between the first lens array and the second lens array.

12. The light-adjusting unit according to claim 1, wherein the rotation transmitting gear includes a worm wheel.

* * * * *